(12) United States Patent
Park (10) Patent No.: US 8,555,619 B2
(45) Date of Patent: Oct. 15, 2013

(54) EXHAUST SYSTEM

(75) Inventor: Jin Woo Park, Suwon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 612 days.

(21) Appl. No.: 12/835,274

(22) Filed: Jul. 13, 2010

(65) Prior Publication Data

US 2011/0099976 A1 May 5, 2011

(30) Foreign Application Priority Data

Nov. 2, 2009 (KR) .................. 10-2009-0105016

(51) Int. Cl.
*F01N 3/00* (2006.01)

(52) U.S. Cl.
USPC .............. 60/295; 60/275; 60/286; 60/297

(58) Field of Classification Search
USPC .................... 60/275, 286, 297, 295
See application file for complete search history.

(56) References Cited

U.S. PATENT DOCUMENTS

| | | | |
|---|---|---|---|
| 5,630,315 A | 5/1997 | Theis | |
| 2001/0018825 A1* | 9/2001 | Kuji et al. | 60/286 |
| 2004/0221571 A1 | 11/2004 | Lewis, Jr. et al. | |
| 2005/0188680 A1 | 9/2005 | Ueda et al. | |
| 2006/0225407 A1 | 10/2006 | Tahara et al. | |
| 2008/0115485 A1* | 5/2008 | Lee | 60/276 |
| 2008/0264044 A1* | 10/2008 | Kogo | 60/295 |
| 2009/0120069 A1* | 5/2009 | Nagaoka et al. | 60/286 |
| 2009/0282809 A1* | 11/2009 | Toshioka | 60/285 |
| 2009/0313971 A1* | 12/2009 | Mueller-Stach et al. | 60/276 |
| 2010/0206060 A1 | 8/2010 | Liu et al. | |
| 2011/0023464 A1* | 2/2011 | Lee et al. | 60/286 |
| 2011/0047983 A1* | 3/2011 | Lee et al. | 60/286 |

FOREIGN PATENT DOCUMENTS

| | | |
|---|---|---|
| DE | 10 2008 049 098 A1 | 6/2009 |
| DE | 10 2008 049 099 A1 | 6/2009 |
| EP | 1 857 647 A1 | 11/2007 |
| EP | 1 900 928 A1 | 3/2008 |
| WO | WO 2008/090433 A1 | 7/2008 |

* cited by examiner

*Primary Examiner* — Thomas Denion
*Assistant Examiner* — Anthony Ayala Delgado
(74) *Attorney, Agent, or Firm* — Morgan, Lewis & Bockius LLP (57) ABSTRACT

An exhaust system, may include a trapping filter, a nitrogen oxide purification catalyst to eliminate nitrogen oxide of the exhaust gas, an injector that selectively injects fuel in the exhaust line, a fuel cracking catalyst that is disposed between the injector and the trapping filter at the exhaust line, transforms the injected fuel to a reducing agent, and a control portion that controls the injector to inject a predetermined amount of the fuel for a predetermined time period so as to raise the temperature of the trapping filter to a predetermined regeneration temperature and eliminate the particulate material trapped in the trapping filter, wherein the control portion detects a degradation rate of the fuel cracking catalyst, and varies the predetermined regeneration temperature of the trapping filter depending on the degradation rate.

3 Claims, 6 Drawing Sheets

EXHAUST SYSTEM

CROSS-REFERENCE TO RELATED APPLICATION

The present application claims priority to Korean Patent Application No. 10-2009-0105016, filed on Nov. 2, 2009, the entire contents of which is incorporated herein for all purposes by this reference.

BACKGROUND OF THE INVENTION

1. Field of the Invention

The present invention relates to an exhaust system. More particularly, the present invention relates to an exhaust system that traps particulate materials included in the exhaust gas, and eliminates the trapped particulate materials in a predetermined condition.

2. Description of Related Art

Generally, exhaust gas that is exhausted through an exhaust manifold of an engine is induced to pass through a catalytic converter that is mounted in the middle of an exhaust pipe to be purified, and the noise thereof is reduced while passing through a muffler before the exhaust gas is discharged to the outside through a tail pipe.

The catalytic converter processes the pollution materials that are included in the exhaust gas. Further, a particulate filter is mounted on the exhaust pipe to trap particulate material (PM) that is included in the exhaust gas.

A selective catalytic reduction device is a type of catalytic converter. Reducing agents such as carbon monoxide, total hydrocarbon (THC), and so on react well with nitrogen oxide rather than oxygen in the selective catalyst reduction apparatus (SCR), which is why it is called a selective catalyst reduction apparatus (SCR).

In an internal combustion engine to which the selective catalyst reduction apparatus is installed, the fuel is continuously and additionally injected according to the nitrogen oxide amount in the exhaust gas. Accordingly, the hydrocarbon can be slipped from the selective catalyst reduction apparatus, and the fuel consumption is increased.

Also, when the reducing agent is continuously supplied, an oxidation/reduction reaction is also continuously performed in the exhaust pipe. Accordingly, the durability of the catalyst is deteriorated by reaction heat that is formed during the oxidation/reduction reaction.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an exhaust system having advantages of varying a regeneration temperature depending on the degradation rate of a catalyst.

In an aspect of the present invention, the exhaust system, may include a trapping filter that is disposed at an exhaust line to trap particulate material of exhaust gas, a nitrogen oxide purification catalyst that is disposed at a downstream side of the trapping filter to eliminate nitrogen oxide of the exhaust gas, an injector that selectively injects fuel in the exhaust line, a fuel cracking catalyst that is disposed between the injector and the trapping filter at the exhaust line, transforms the injected fuel to a reducing agent, and raises the temperature of the downstream side thereof, and a control portion that controls the injector to inject a predetermined amount of the fuel for a predetermined time period so as to raise the temperature of the trapping filter to a predetermined regeneration temperature and eliminate the particulate material trapped in the trapping filter, wherein the control portion detects a degradation rate of the fuel cracking catalyst, and varies the predetermined regeneration temperature of the trapping filter depending on the degradation rate.

The fuel cracking catalyst may include a DOC (diesel oxidation catalyst)

The nitrogen oxide purification catalyst may use the reducing agent that is formed by the fuel cracking catalyst to detach and reduce the nitrogen oxide in the nitrogen oxide purification catalyst, When the ratio of the nitrogen trapped in the nitrogen oxide purification catalyst to HC of the exhaust gas is lower than a predetermined value, the controller may control the injector to inject the predetermined amount of the fuel for the predetermined time period into the exhaust gas.

The control portion may use a temperature difference between an upstream side and a downstream side of the fuel cracking catalyst to detect the degradation rate thereof, and varies the degeneration rate when it is determined that the temperature difference thereof is smaller than a predetermined value after the injector injects the fuel.

The control portion may use a temperature difference between an upstream side and a downstream side of the nitrogen oxide purification catalyst to detect the degradation rate thereof, and varies the degeneration rate when it is determined that the temperature difference thereof is larger than or equal to a predetermined value after the injector injects fuel.

The control portion may detect the degradation rate of the fuel cracking catalyst by using an oxygen concentration difference between an upstream side and the downstream side of the fuel cracking catalyst, and varies the degradation rate when it is determined that the oxygen concentration difference is larger than a predetermined value after the injector injects fuel.

The control portion may detect the degradation rate of the fuel cracking catalyst by using a purification ratio of the nitrogen oxide purification catalyst, and varies the degradation rate when it is determined that the purification ratio of the nitrogen oxide purification catalyst is larger than or equal to a predetermined value.

The control portion may compensate the predetermined injection amount and the predetermined time period of the injector when a temperature difference between an upstream side and a downstream side of the fuel cracking catalyst is smaller than a predetermined value, a temperature difference between an upstream side and a downstream side of the nitrogen oxide purification catalyst is smaller than a predetermined value, an oxygen concentration difference between an upstream side and the downstream side of the fuel cracking catalyst is larger than a predetermined value, and a purification ratio of the nitrogen oxide purification catalyst is larger than or equal to a predetermined value.

The injector may include a first injector that is configured to inject fuel in intake air or into a cylinder of an engine, or a second injector that is disposed at the exhaust line.

In another aspect of the present invention, a method of controlling an exhaust system, may include steps of determining whether a regeneration condition of a nitrogen oxide purification catalyst or a regeneration condition of a trapping filter is satisfied or not, injecting a predetermined amount of fuel for a predetermined time period as a reducing agent when either or both of the regeneration conditions are satisfied, determining whether a first temperature difference between a front side and a rear side of a fuel cracking catalyst is larger than or equal to a first predetermined value, determining whether a second temperature difference between a front side and a rear side of the nitrogen oxide purification catalyst is larger than or equal to a second predetermined value, determining whether an oxygen concentration difference between an upstream of the fuel cracking catalyst and a downstream of the nitrogen oxide purification catalyst is larger than a third predetermined value, and changing a regeneration target temperature of the trapping filter when the first temperature difference is smaller than the first predetermined value, the second temperature difference is larger than or equal to the second predetermined value, the oxygen concentration difference is larger than the third predetermined value, and a purification ratio of the nitrogen oxide purification catalyst is larger than or equal to a fourth predetermined value, wherein the trapping filter is disposed at an exhaust line, the nitrogen oxide purification catalyst is disposed at a downstream side of the trapping filter, and the fuel cracking catalyst is disposed between the injector and the trapping filter at the exhaust line.

The method may further include compensating the predetermined injection amount and the predetermined time period of the injector when the first temperature difference is larger than or equal to the second predetermined value, the second temperature difference is smaller than the second predetermined value, the oxygen concentration difference is larger than the third predetermined value, and the purification ratio of the nitrogen oxide purification catalyst is larger than or equal to the fourth predetermined value.

The method may further include determining as a normal driving state, when the first temperature difference is larger than or equal to the first predetermined value, the second temperature difference is larger than or equal to the second predetermined value, and the oxygen concentration difference is larger than the third predetermined value.

As stated above, if the degradation rate of the fuel cracking catalyst is higher than a predetermined value, the regeneration temperature of the trapping filter is varied so as to raise the regeneration efficiency thereof.

Further, CO/THC is hardly slipped through the trapping filter, such that the degradation of the nitrogen oxide purification catalyst is prevented.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
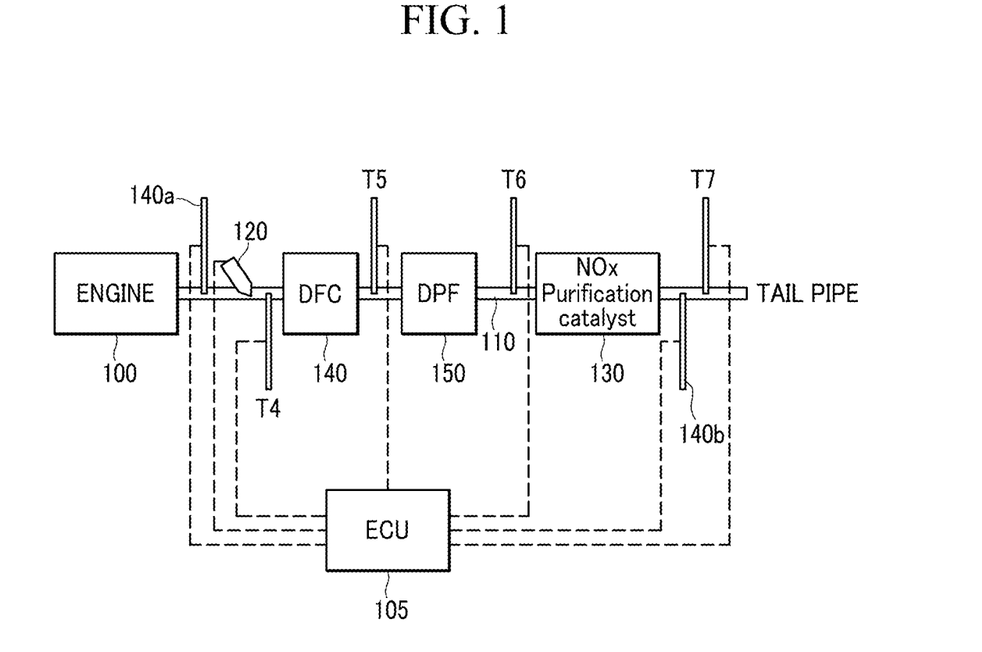
FIG. 1 is a schematic diagram of an exemplary exhaust system according to the present invention.

FIG. 1 is a schematic diagram of an exhaust system according to an exemplary embodiment of the present invention.

Referring to FIG. 1, an exhaust system includes an engine 100, an exhaust line 110, a first oxygen sensor 140a, an injector 120, a third temperature sensor T4, a fuel cracking catalyst 140, a fourth temperature sensor T5, a trapping filter 150, a first temperature sensor T6, a nitrogen oxide purification catalyst 130, a second oxygen sensor 140b, and a second temperature sensor T7.

A control portion 105 may be realized as at least one microprocessor programmed with a predetermined program, and the predetermined program may include a set of instructions for performing methods according to an exemplary embodiment of the present invention.

On the exhaust line 110, the first oxygen sensor 140a, the injector 120, the third temperature sensor T4, the fuel cracking catalyst 140, the fourth temperature sensor T5, the trapping filter 150, the first temperature sensor T6, the nitrogen oxide purification catalyst 130, the second oxygen sensor 140b, and the second temperature sensor T7 are sequentially disposed.

The first oxygen sensor 140a and the second oxygen sensor 140b detect an oxygen concentration difference passing through the exhaust line 110, and transfer the detected signals to control portion 105.

The control portion 105 detects regeneration timing of the trapping filter 150 or the nitrogen oxide purification catalyst 130, and controls the injector to inject fuel depending on the regeneration timing.

The fuel injected by the injector 120 passes the fuel cracking catalyst 140, and is activated to be transformed to a reducing agent such as a hydrocarbon, etc. The fuel cracking catalyst 140 performs DFC (diesel fuel cracking) that activates diesel fuel.

Also, in an exemplary embodiment of the present invention, the fuel cracking catalyst 140 can be a DOC (diesel oxidation catalyst) that oxidizes or reduces harmful materials of the exhaust gas, or can include a catalyst performing functions of the DOC.

The trapping filter 150 filters particulate materials of the exhaust gas that is exhausted from the engine, and burns to eliminate the filtered particulate materials depending on the regeneration cycle. Here, the particulate materials that are trapped in the trapping filter 150 can be eliminated in a condition of higher than a predetermined temperature.

In this case, the trapped particulate materials in the trapping filter 150 are combusted by fuel injected from the engine 100.

Meanwhile, the ratio of the nitrogen trapped in the nitrogen oxide purification catalyst 130 and the HC of the exhaust gas is set in map data beforehand, the control portion 105 compares the HC ratio to NOx in a real driving condition with a predetermined value of the map data, and if the HC ratio to NOx is lower than a predetermined value, the injector 120 is operated to inject fuel into the exhaust gas.

The control portion 105 controls a fuel injection amount and injection timing based on signals detected from the sensors and the map data in such a manner that the nitrogen oxide trapped in the nitrogen oxide purification catalyst 130 is desorbed to be reduced by the reducing agent.

Figure 2A:
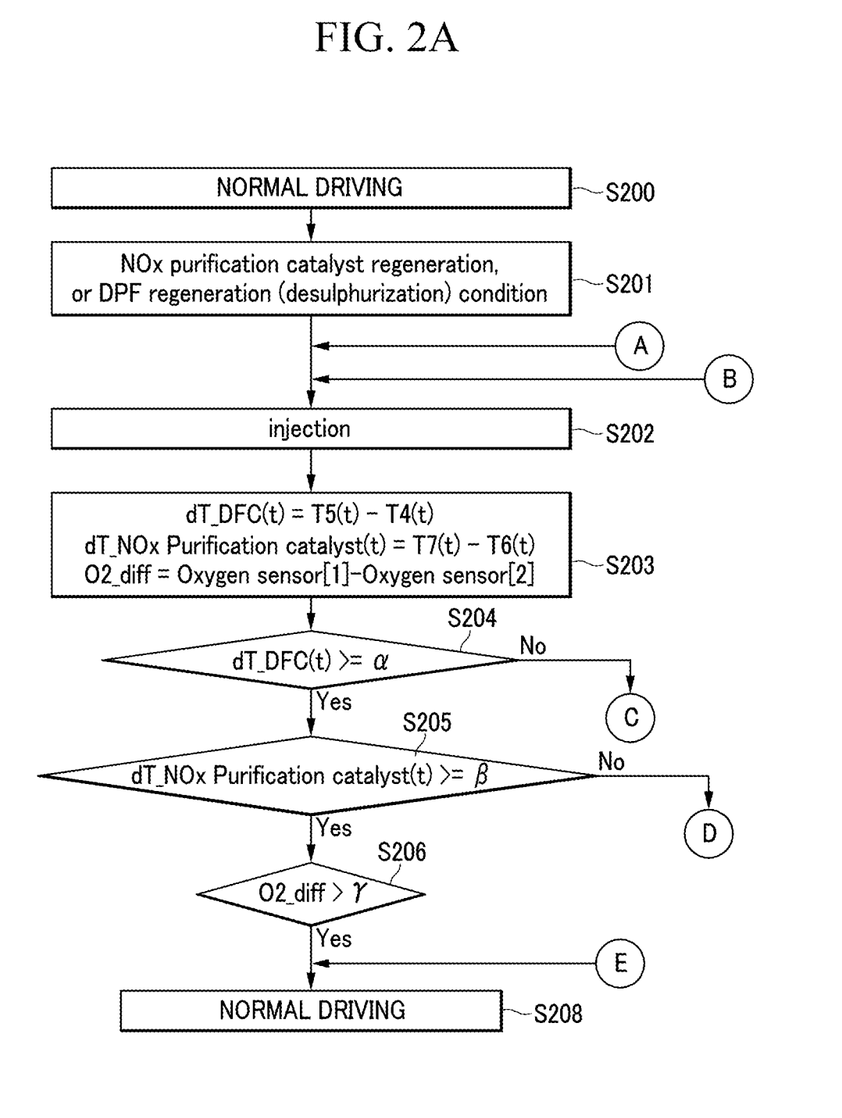
FIG. 2A and FIG. 2B are control flowcharts of an exemplary exhaust system according to the present invention.
Figure 2B:
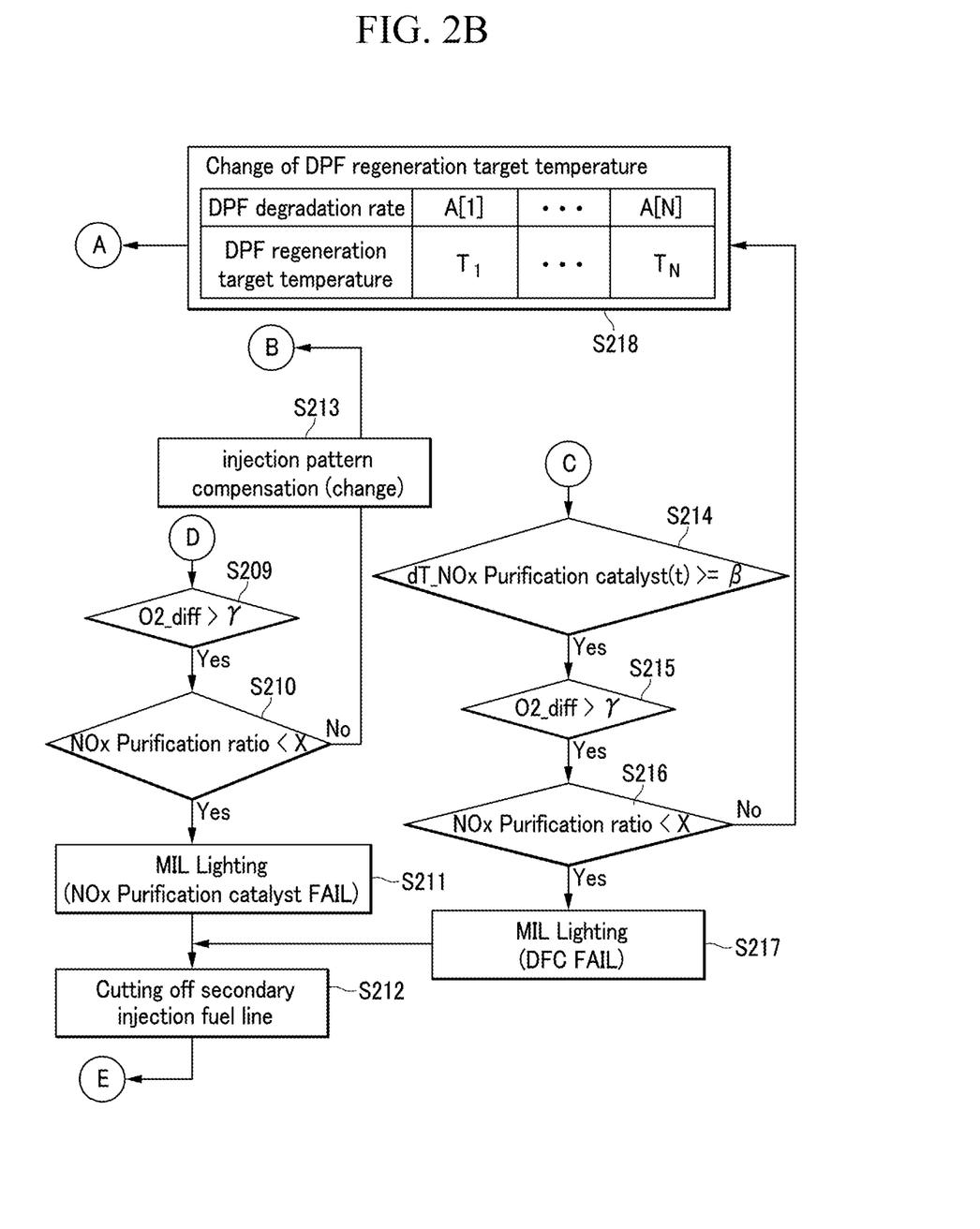

FIG. 2A and FIG. 2B are control flowcharts of an exhaust system according to an exemplary embodiment of the present invention.

Referring to FIG. 2A and FIG. 2B, the control method of the exhaust system includes a set of instructions for performing a zero step S200, a first step S201, a second step S202, a third step S203, a fourth step S204, a fifth step S205, a sixth step S206, an eighth step S208, a ninth step S209, a tenth step S210, an eleventh step S211, a twelfth step S212, a thirteenth step S213, a fourteenth step S214, a fifteenth step S215, a sixteenth step S216, a seventeenth step S217, and a eighteenth step S218.

In the zero step S200, the engine 100 is started, and in the first step S201, it is determined whether the regeneration condition of the nitrogen oxide purification catalyst 130 or the regeneration (desulfurization) condition of the trapping filter is satisfied or not.

If the condition is satisfied, the injector 120 injects fuel as a reducing agent in the second step S202.

If the fuel is injected by the injector 120, the temperature difference between the upstream side and the downstream side of the fuel cracking catalyst 140 is detected, and the temperature difference between the upstream side and the downstream side of the nitrogen oxide purification catalyst 130 is detected in the third step S203.

Further, an oxygen concentration difference between the first oxygen sensor 140a and the second oxygen sensor 140b is detected in the third step S203.

If it is determined that the temperature difference between the front side and the rear side of the fuel cracking catalyst 140 is larger than a predetermined value in the fourth step S204, it is determined whether the temperature difference between the front side and the rear side of the nitrogen oxide purification catalyst 130 is larger than a predetermined value in the fifth step S205, and if the temperature difference is larger than that, it is determined whether the oxygen concentration difference between the first oxygen sensor 140a and the second oxygen sensor 140b is larger than a predetermined value in the sixth step S206.

If the temperature difference between the front side and the rear side of the fuel cracking catalyst 140, the temperature difference between the front side and the rear side of the nitrogen oxide purification catalyst 130, and the oxygen concentration difference between the first oxygen sensor 140a and the second oxygen sensor 140b are respectively larger than predetermined values in the fourth step S204, the fifth step S205, and the sixth step S206, it is determined as the normal driving state that the fuel cracking catalyst 140 and the nitrogen oxide purification catalyst 130 are not deteriorated.

If it is determined that the fuel cracking catalyst 140 and the nitrogen oxide purification catalyst 130 are not degraded, the engine 100 is normally operated in the eighth step S208.

If the temperature difference between the front side and the rear side of the fuel cracking catalyst 140 is lower than a predetermined value in the fourth step S204, the fourteenth step S214, the fifteenth step S215, and the sixteenth step S216 are performed.

If the front/rear temperature difference of the nitrogen oxide purification catalyst 130 is larger than a predetermined value in the fourteenth step S214 and if the oxygen concentration difference between the first oxygen sensor and the second oxygen sensor 140b is larger than a predetermined value in the fifteenth step S215, it is determined whether the nitrogen oxide purification ratio of the nitrogen oxide purification catalyst 130 is smaller than a predetermined value in the sixteenth step S216.

A method for calculating the purification ratio of the nitrogen oxide purification catalyst 130 is well known, so a detailed description is omitted in this description according to an exemplary embodiment of the present invention.

In the sixteenth step S216, it is determined whether the degraded fuel cracking catalyst 140 is being operated within a predetermined range of a maximum capacity.

If the purification ratio of the nitrogen oxide purification catalyst 130 is lower than a predetermined value in the sixteenth step S216, it is determined that the fuel cracking catalyst 140 does not operate in the seventeenth step S217, and then an emergency lamp is lit.

Further, if it is determined that the nitrogen oxide purification catalyst 130 has a predetermined purification ratio in the sixteenth step S216, the regeneration temperature of the trapping filter 150 is varied depending on the degradation rate of the fuel cracking catalyst 140 in the eighteenth step S218.

If the front/rear temperature difference of the nitrogen oxide purification catalyst 130 is smaller than a predetermined value in the fifth S205 and if the oxygen concentration difference between the first oxygen sensor 140a and the second oxygen sensor 140b is larger than a predetermined value in the ninth step S209, it is determined whether the nitrogen oxide purification ratio of the nitrogen oxide purification catalyst 130 is larger than or equal to a predetermined value in the tenth step S210.

If it is determined that the nitrogen oxide purification ratio of the nitrogen oxide purification catalyst 130 is larger than or equal to a predetermined value in the tenth step S210, the injection amount of the injector is compensated in the thirteen step S213 to form a secondary injection of the injector 120.

However, if it is determined that the nitrogen oxide purification ratio of the nitrogen oxide purification catalyst 130 is smaller than a predetermined value in the tenth step S210, an emergency lamp is lit and the secondary injection of the injector 120 is cut off in the eleventh step S211.

As described above, the degradation rate of the trapping filter 150 can be calculated based on the temperature difference between the temperature sensors T4 and T5 that are disposed at the front side and the rear side of the fuel cracking catalyst 140. That is, as the temperature difference becomes smaller, the degradation rate becomes larger.

The relationship between the front/rear temperature difference and the degradation rate of the trapping filter 150 can be set by experimentation.

For example, if the degradation rate of the trapping filter 150 is low, the regeneration temperature of the trapping filter 150 can be varied to a relatively low value, and if the degradation rate of the trapping filter 150 is high, the regeneration temperature of the trapping filter 150 can be varied to a relatively high value.

In an exemplary embodiment of the present invention, the regeneration temperature of the trapping filter 150 can be varied according to a predetermined map data. Further, the regeneration temperature, a regeneration cycle, and regeneration time of the trapping filter 150 can be varied depending on the degradation rate of the trapping filter 150.

Figure 3:
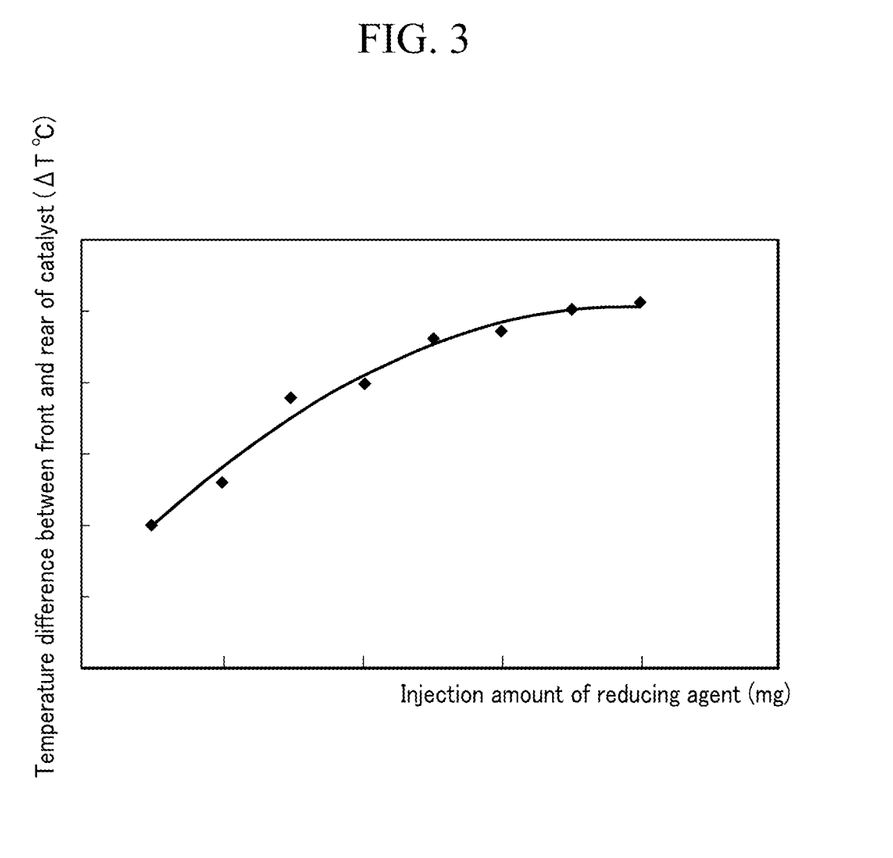
FIG. 3 is a graph showing a reducing agent injection amount and a temperature difference between a front and a rear of a catalyst in an exemplary exhaust system according to the present invention.

FIG. 3 is a graph showing a reducing agent injection amount and a temperature difference between a front and a rear of a catalyst in an exhaust system according to an exemplary embodiment of the present invention.

Referring to FIG. 3, as the fuel injection amount that is injected through the injector 120 as a reducing agent becomes larger, the front/rear temperature difference of the nitrogen oxide purification catalyst 130 or the fuel cracking catalyst 140 becomes larger.

Since the injected fuel passes the nitrogen oxide purification catalyst 130 or the fuel cracking catalyst 140 to be oxidized, the high temperature exhaust gas is supplied to the rear side thereof.

Figure 4:
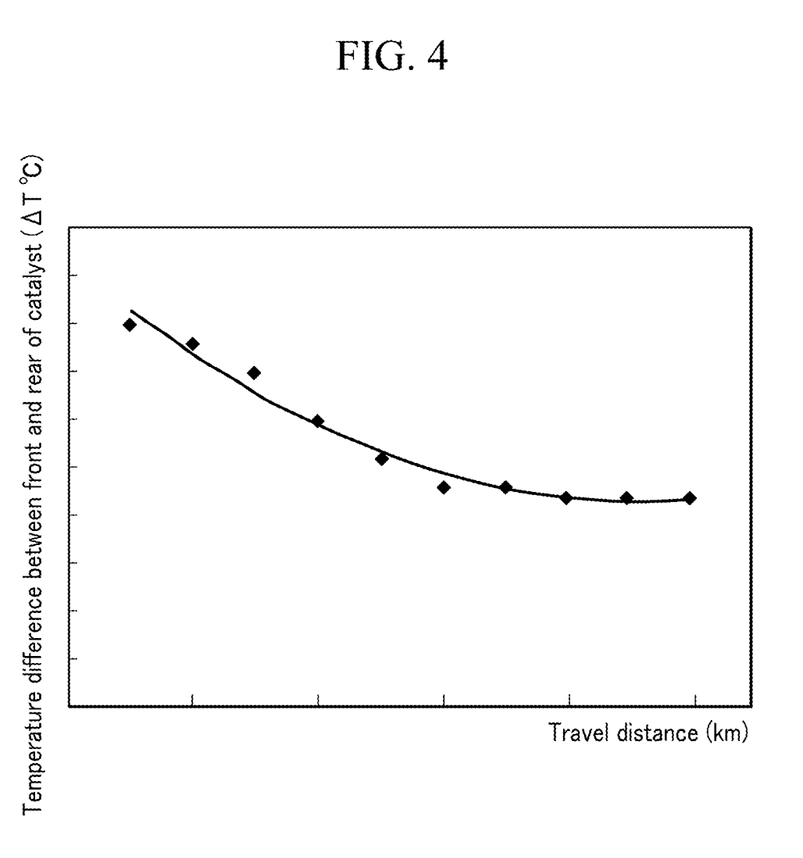
FIG. 4 is a graph showing a temperature difference between a front and a rear of a catalyst depending on the travel distance in an exemplary exhaust system according to the present invention.

FIG. 4 is a graph showing a temperature difference between a front and a rear of a catalyst depending on the travel distance in an exhaust system according to an exemplary embodiment of the present invention.

Referring to FIG. 4, as the engine operating time or the travel distance of a vehicle becomes longer, the front/rear temperature difference of the nitrogen oxide purification catalyst 130 or the fuel cracking catalyst 140 becomes smaller, if predetermined conditions are identical.

That is, as the travel distance becomes longer, catalyst elements included in the nitrogen oxide purification catalyst 130 or the fuel cracking catalyst 140 are degraded and the performance thereof is deteriorated.

Accordingly, after the fuel is injected through the injector 120, when the injected fuel passes the catalysts, the oxidation rate thereof is decreased, such that the exhaust gas temperature, which is supplied to the rear side thereof, is relatively lowered.

Figure 5:
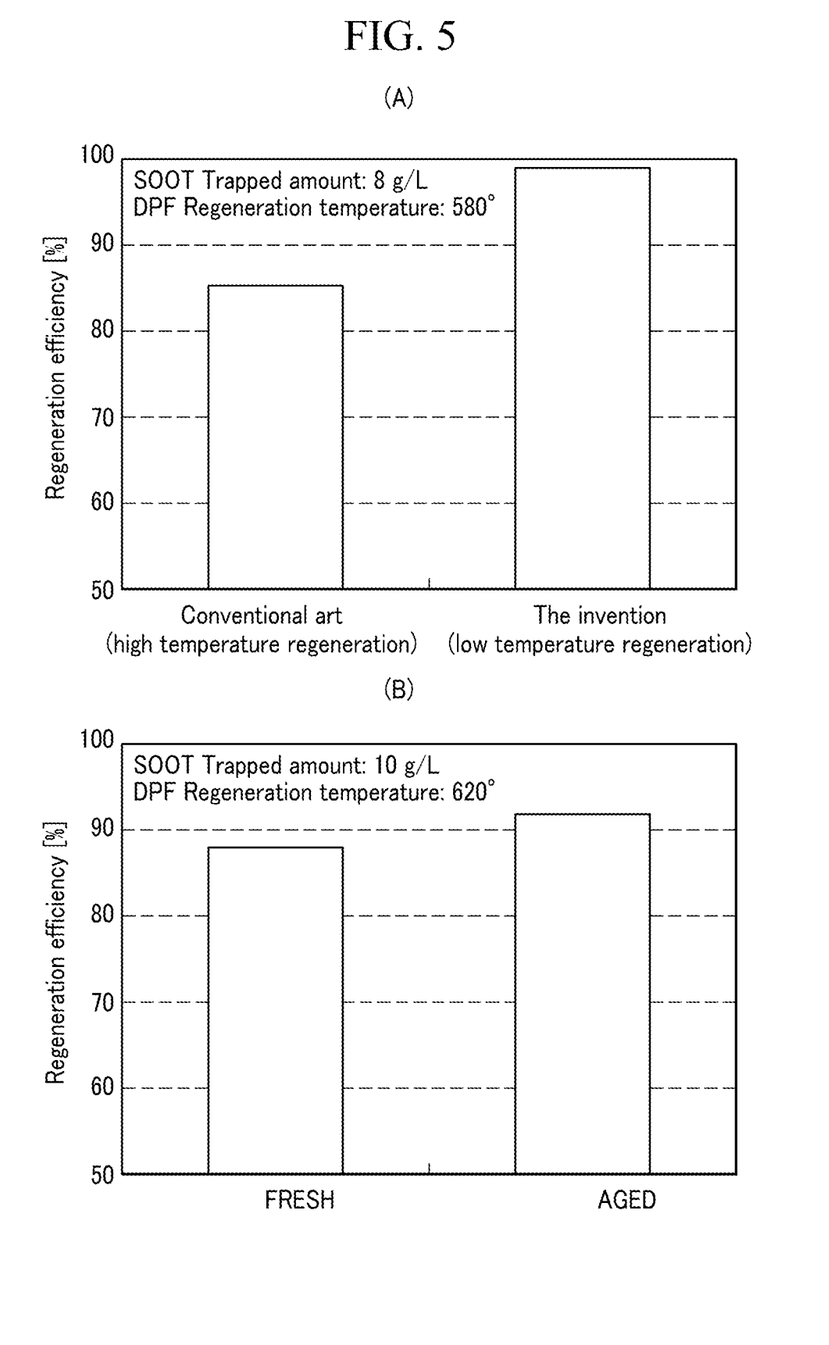
FIG. 5 is a graph showing characteristics of a trapping filter that is equipped in an exemplary exhaust system according to the present invention.

FIG. 5 is a graph showing characteristics of a trapping filter that is equipped in an exhaust system according to an exemplary embodiment of the present invention.

Referring to (a) of FIG. 5, the horizontal axis signifies trapping filters according to the deterioration rate thereof, and the vertical axis signifies the regeneration efficiency thereof.

In the same condition in which the trapping amount is 8 g/L and the regeneration temperature is 580° C., regeneration efficiency of a conventional trapping filter is about 85%, and regeneration efficiency of the trapping filter according to an exemplary embodiment of the present invention is about 98% as a low temperature regeneration type.

A low temperature regeneration catalyst is coated in the trapping filter, differently from a general trapping filter. Thus, in a case that the same amount of PM (particulate materials) is trapped, high regeneration efficiency is achieved at a relatively low temperature.

If a low temperature regeneration catalyst is applied, an injected amount is decreased. Thus, fuel is saved, and degradation speed of the catalyst becomes slow.

Referring to (b) of FIG. 5, the horizontal axis shows two trapping filters of which degradation rate of one is low and degradation rate of the other is high, and the vertical axis shows regeneration efficiency depending on the degradation rate.

In a case that a trapping filter is regenerated at 620° C., regeneration efficiency of a trapping filter having a low degradation rate is about 88%, and regeneration efficiency of a trapping filter having a high degradation rate is about 92%.

That is, as the degradation rate is increased, it has to be regenerated at a higher temperature so as to raise regeneration efficiency.

Further, the fuel cracking catalyst can include an oxidation catalyst function or can be changed to an oxidation catalyst in FIG. 1, FIG. 2A, and FIG. 2B according to an exemplary embodiment of the present invention.

The oxidation catalyst has a function of purifying harmful material included in the exhaust gas through oxidation/reduction reactions, and the fuel cracking catalyst can have an oxidation catalyst function for purifying harmful material included in the exhaust gas in an exemplary embodiment of the present invention.

For convenience in explanation and accurate definition in the appended claims, the terms "upstream", "downstream", "front" or "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an exhaust system, comprising steps of:
    determining whether a regeneration condition of a nitrogen oxide purification catalyst or a regeneration condition of a trapping filter is satisfied or not;
    injecting a predetermined amount of fuel for a predetermined time period as a reducing agent when either or both of the regeneration conditions are satisfied;
    determining whether a first temperature difference between a front side and a rear side of a fuel cracking catalyst is larger than or equal to a first predetermined value;
    determining whether a second temperature difference between a front side and a rear side of the nitrogen oxide purification catalyst is larger than or equal to a second predetermined value;
    determining whether an oxygen concentration difference between an upstream of the fuel cracking catalyst and a downstream of the nitrogen oxide purification catalyst is larger than a third predetermined value; and
    changing a regeneration target temperature of the trapping filter when the first temperature difference is smaller than the first predetermined value, the second temperature difference is larger than or equal to the second predetermined value, the oxygen concentration difference is larger than the third predetermined value, and a purification ratio of the nitrogen oxide purification catalyst is larger than or equal to a fourth predetermined value, wherein the trapping filter is disposed at an exhaust line;

the nitrogen oxide purification catalyst is disposed at a downstream side of the trapping filter; and the fuel cracking catalyst is disposed between the injector and the trapping filter at the exhaust line.

2. The method of claim 1, further comprising:

compensating the predetermined injection amount and the predetermined time period of the injector when the first temperature difference is larger than or equal to the second predetermined value, the second temperature difference is smaller than the second predetermined value, the oxygen concentration difference is larger than the third predetermined value, and the purification ratio of the nitrogen oxide purification catalyst is larger than or equal to the fourth predetermined value.

3. The method of claim 1, further comprising:

determining as a normal driving state, when the first temperature difference is larger than or equal to the first predetermined value, the second temperature difference is larger than or equal to the second predetermined value, and the oxygen concentration difference is larger than the third predetermined value.

* * * * *